(12) United States Patent
Kuwano (10) Patent No.: US 11,873,203 B2
(45) Date of Patent: Jan. 16, 2024

(54) CLEANING METHOD OF HEAT STERILIZATION SYSTEM AND CLEANING APPARATUS THEREOF

(71) Applicant: Dai Nippon Printing Co., Ltd., Tokyo (JP)

(72) Inventor: Seiji Kuwano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 392 days.

(21) Appl. No.: 17/282,856

(22) PCT Filed: Oct. 28, 2019

(86) PCT No.: PCT/JP2019/042167
§ 371 (c)(1),
(2) Date: Apr. 5, 2021

(87) PCT Pub. No.: WO2020/090733
PCT Pub. Date: May 7, 2020

(65) Prior Publication Data
US 2021/0347621 A1 Nov. 11, 2021

(30) Foreign Application Priority Data
Oct. 31, 2018 (JP) .................................. 2018-205728

(51) Int. Cl.
*B67C 3/00* (2006.01)
*B08B 9/027* (2006.01)
*B67C 3/26* (2006.01)

(52) U.S. Cl.
CPC .............. *B67C 3/001* (2013.01); *B08B 9/027* (2013.01); *B67C 3/2642* (2013.01); *B08B 2209/027* (2013.01)

(58) Field of Classification Search
CPC ....... B67C 3/001; B67C 3/004; B67C 3/2642; B08B 9/027; B08B 2209/027
See application file for complete search history.

(56) References Cited

U.S. PATENT DOCUMENTS 8,757,216 B2 * 6/2014 Meinzinger ............. B67C 3/002
141/90
8,776,842 B2 * 7/2014 Clusserath .............. B67C 3/001
141/90

(Continued)

FOREIGN PATENT DOCUMENTS

EP 2 772 319 A1 9/2014
EP 3 395 750 A1 10/2018

(Continued)

OTHER PUBLICATIONS

Japanese Office Action (Application No. 2018-205728) dated Nov. 15, 2019 (with English translation).

(Continued)

*Primary Examiner* — Timothy L Maust
(74) *Attorney, Agent, or Firm* — BURR PATENT LAW, PLLC (57) ABSTRACT

A cleaning method of a heat sterilization system includes: a step of causing a fluid formed of a cleaning liquid or a rinse liquid to flow through the heat sterilization system; a step of supplying hot water to a second-stage heating unit to heat the second-stage heating unit; and a step of measuring fluid temperatures of the fluid at the fluid inlet and the fluid outlet of the second-stage heating unit, and medium temperatures of the hot water at a medium inlet of the second-stage heating unit and a medium outlet of the second-stage heating unit. An overall heat transfer coefficient (U value) of a heating pipe of the second-stage heating unit is calculated based on the fluid temperatures at the fluid inlet and the fluid outlet of the second-stage heating unit and the medium (Continued)

temperatures at the medium inlet and the medium outlet of the second-stage heating unit.

6 Claims, 8 Drawing Sheets

(56) References Cited

U.S. PATENT DOCUMENTS

| | | | |
|---|---|---|---|
| 2014/0286822 A1 | 9/2014 | Hayakawa | |
| 2016/0121376 A1 | 5/2016 | Hayakawa et al. | |
| 2020/0391989 A1* | 12/2020 | Hayakawa | A61L 2/04 |
| 2021/0347621 A1* | 11/2021 | Kuwano | F28G 9/00 |

FOREIGN PATENT DOCUMENTS

| | | | |
|---|---|---|---|
| JP | H10-281695 A1 | 10/1998 | |
| JP | 2000-333657 A1 | 12/2000 | |
| JP | 3437942 B2 | 8/2003 | |
| JP | 2003-322494 A1 | 11/2003 | |
| JP | 2011-255938 A1 | 12/2011 | |
| JP | 2013-091018 A1 | 5/2013 | |
| JP | 2015-044593 A1 | 3/2015 | |
| JP | 2020-179942 A | 11/2020 | |
| WO | 2017/111047 A1 | 6/2017 | |

OTHER PUBLICATIONS

International Search Report and Written Opinion (Application No. PCT/JP2019/042167) dated Jan. 14, 2020.
Japanese Office Action (Application No. 2020-114625) dated Jun. 4, 2021 (with English translation).
Extended European Search Report dated Jun. 24, 2002 (Application No. 19879397.8).
English translation of the International Preliminary Report on Patentability (Chapter I)(Application No. PCT/JP2019/042167) dated May 14, 2021.

* cited by examiner

CLEANING METHOD OF HEAT STERILIZATION SYSTEM AND CLEANING APPARATUS THEREOF

TECHNICAL FIELD

The present invention relates to a cleaning method of a heat sterilization system for filling a container, such as a PET bottle, with a beverage (content), and a cleaning apparatus thereof.

BACKGROUND ART

An aseptic filling system for filling a container, such as a bottle, with a beverage has been conventionally known. Such an aseptic filling system comprises a heat sterilization apparatus that heats a beverage, and a filling machine. The filling machine includes an aseptic chamber where a bottle is filled with a beverage.

Patent Document 1: JP2011-255938A
Patent Document 2: JP2015-44593A
Patent Document 3: JP3437942B Conventionally, after the heat sterilization apparatus has been used for a predetermined period of time, an inside thereof is cleaned by supplying the heat sterilization apparatus sequentially with a cleaning liquid and a rinse liquid.

Such a cleaning method of a heat sterilization apparatus is referred to as CIP cleaning (Cleaning In Place) and is widely utilized. However, since the technique of how long the CIP cleaning should be performed has not been established so far, the CIP cleaning is actually performed unnecessarily for a long time.

The present disclosure has been made in view of such a problem. The object of the present invention is to provide a cleaning method of a heat sterilization system and a cleaning apparatus thereof that are capable of reliably cleaning an inside of a heat sterilization apparatus by performing the CIP cleaning just for an appropriate time.

DISCLOSURE

The present disclosure is a cleaning method of a heat sterilization system comprising a heating section for heating a content, the heating section having a heating pipe with a fluid inlet and a fluid outlet, the cleaning method comprising: a step of causing a fluid including at least a cleaning liquid to flow through the heat sterilization system so as to clean an inside of the heat sterilization system; a step of heating the heating pipe of the heating section from outside by means of a medium; a step of measuring fluid temperatures of the fluid at the fluid inlet and the fluid outlet of the heating pipe; a step of measuring medium temperatures of the medium at a medium inlet and a medium outlet of the heating section; and a step of calculating and monitoring an overall heat transfer coefficient of the heating pipe, based on the fluid temperatures at the fluid inlet and the fluid outlet of the heating pipe and the medium temperatures at the medium inlet and the medium outlet of the heating section.

The present disclosure is the cleaning method of a heat sterilization system, wherein when the overall heat transfer coefficient exceeds a desired value, the cleaning of the inside of the heat sterilization system is finished.

The present disclosure is the cleaning method of a heat sterilization system, wherein a cleaning condition of the heat sterilization system is determined based on the overall heat transfer coefficient.

The present disclosure is the cleaning method of a heat sterilization system, wherein a plurality of the heating sections are provided, and an overall heat transfer coefficient of the heating pipe of the heat section on the most downstream side is monitored.

The present disclosure is a cleaning apparatus of a heat sterilization system comprising a heating section for heating a content, the heating section having a heating pipe with a fluid inlet and a fluid outlet, the cleaning apparatus comprising: a fluid supply unit that causes a fluid including at least a cleaning liquid to flow through the heat sterilization system so as to clean an inside of the heat sterilization system; a heating unit that heats the heating pipe of the heating section from outside by means of a medium; a thermometer that measures fluid temperatures of the fluid at the fluid inlet and the fluid outlet of the heating pipe, and medium temperatures of the medium at a medium inlet and a medium outlet of the heating section; and a control unit; wherein the control unit includes a monitor unit that calculates and monitors an overall heat transfer coefficient of the heating pipe, based on the fluid temperatures at the fluid inlet and the fluid outlet of the heating pipe and the medium temperatures at the medium inlet and the medium outlet of the heating section.

The present disclosure is the cleaning apparatus of a heat sterilization system, wherein the control unit finishes the cleaning of the inside of the heat sterilization system, when the overall heat transfer coefficient exceeds a desired value.

The present disclosure is the cleaning apparatus of a heat sterilization system, wherein the control unit includes a cleaning-condition determination unit that determines a cleaning condition of the heat sterilization system based on the overall heat transfer coefficient.

The present disclosure is the cleaning apparatus of a heat sterilization system, wherein a plurality of the heating sections are provided, and the control unit monitors an overall heat transfer coefficient of the heating pipe of the heat section on the most downstream side.

The present disclosure enables to reliably clean an inside of a heat sterilization system only by performing the CIP cleaning just for an appropriate time.

EMBODIMENT

Figure 2:
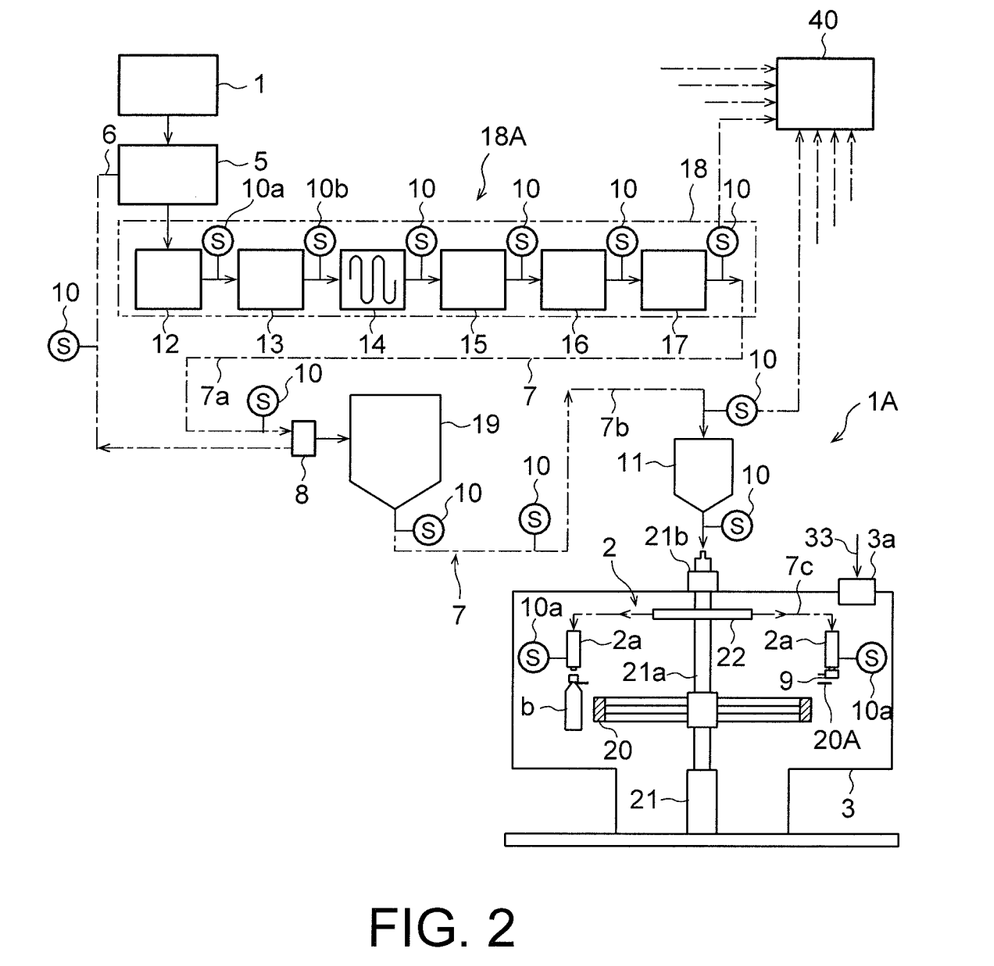
FIG. 2 is a block diagram of the aseptic filling system according to an embodiment.

An aseptic filling system 1A in which a heat sterilization system (or a cleaning apparatus of a heat sterilization system) of the present invention is incorporated is firstly described as a whole, with reference to FIG. 2.

As shown in FIG. 2, the aseptic filling system 1A fills a plastic bottle (also referred to as a container) b with a beverage (also referred to as a content) in an aseptic state.

Such an aseptic filling system 1A comprises a preparation apparatus 1, a balance tank 5, a heat sterilization apparatus (also referred to as heat sterilization system) (UHT) 18, a surge tank 19, a head tank 11, and a filler (also referred to as a filling machine) including a filling nozzle 2a for filling the bottle b with a beverage in an aseptic state, which are arranged in this order.

The preparation apparatus 1 is for preparing ingredients at desired preparation ratios in order to make a beverage such as coffee with milk, black coffee, tea beverage, fruit beverage, etc.

The preparation apparatus 1, the balance tank 5, the UHT 18, the surge tank 19, and the filling nozzle 2a in the filler 2 are connected to one another through a beverage supply pipe 7.

The aseptic filling system 1A is provided with a bottle transport path through which a bottle b is transported to the filler 2 and through which a bottle b filled with a content by the filler 2 is discharged. The transport path is typically formed by a plurality of wheels 20 and grippers 20A disposed around the respective wheels 20, and the like.

The filler 2 is a filling machine that fills a large number of bottles b with a beverage at a high speed. The filler 2 comprises an aseptic chamber 3, a plurality of filling nozzles 2a provided in the aseptic chamber 3 for filling bottles b with a beverage, and the wheels 20 provided in the aseptic chamber 3 for forming a part of the transport path. The wheel 20 is mounted on a pivot shaft 21a extending from a support shaft 21 that vertically stands from a floor surface of the aseptic apparatus. The grippers 20A each of which grips a neck of a bottle b are arranged at constant pitches around the wheel 20. The grippers 20A are pivotable integrally with the wheel 20 in one direction. The filling nozzles 2a are mounted around the wheel 20 at the same pitches as those of the grippers 20A.

A rotary joint 21b is provided on an upper end of the pivot shaft 21a extending upward from the support shaft 21. An upper manifold 22 is provided on the pivot shaft 21a below the rotary joint 21b. A part of the pivot shaft 21a, between an upper part of the support shaft 21 and the upper manifold 22, is hollow. A downstream pipe part 7b of the aforementioned beverage supply pipe 7 is connected to the rotary joint 21b. A connection pipe part 7c extends between the upper manifold 22 and the respective filling nozzles 2a.

When the filler 2 is actuated, the wheel 20 is pivoted at a high speed. In synchronization with this movement, bottles b gripped by the grippers 20A are transported at a high speed along the transport path. When a bottle b reaches directly below a nozzle opening at a lower end of the filling nozzle 2a, a certain amount of beverage is filled into each bottle b one after another.

The filler 2 is entirely housed in the aseptic chamber 3, as described above, in order that the aseptically processed beverage can be filled into the aseptically processed bottles b such that any foreign substance such as microorganisms do not enter the bottles b. The aseptic chamber 3 has an inlet for bottles b on an upstream side of the transport path, and an outlet for bottles b on a downstream side thereof.

Next, the aseptic filling system 1A is further described. The beverage supply pipe 7 includes an upstream pipe part 7a and the downstream pipe part 7b. In the upstream pipe part 7a extending from the preparation apparatus 1 to reach the surge tank 19, the balance tank 5, the heat sterilization system (UHT (Ultra High-temperature)) 18 and a manifold valve 8 are disposed in this order from the upstream side to the downstream side. In the downstream pipe part 7b extending from the surge tank 19 to reach the filler 2, a head tank (buffer tank) 11 is disposed. The head tank 11 may be omitted.

The UHT 18 comprises therein a first-stage heating unit (first-stage heating section) 12, a second-stage heating unit (second-stage heating section) 13, a holding tube 14, a first-stage cooling unit (first-stage cooling section) 15, a second-stage cooling unit (second-stage cooling section) 16, and a third-stage cooling unit (third-stage cooling section) 17. A beverage supplied from the balance tank 5 is sent to the first-stage heating unit 12 and the second-stage heating unit 13. In the first-stage heating unit 12 and the second-stage heating unit 13, the beverage is gradually heated. In the holding tube 14, the beverage is held at a target temperature. Thereafter, the beverage is sent to the first-stage cooling unit 15, the second-stage cooling unit 16 and the third-stage cooling unit 17 where the beverage is gradually cooled. The number of the first and second-stage heating units 12 and 13 and the number of the first to third-stage cooling unit 15, 16 and 17 can be increased or decreased according to need.

In the beverage supply pipe 7, the upstream pipe part 7a, which reaches the manifold valve 8 via the balance tank 5 and the UHT 18, is provide with a return line 6. The return line 6 is provided for adding a cleaning liquid and circulating it through the balance tank 5, the heating units 12 and 13 and the cooling units 15, 16 and 17, during the CIP cleaning (Cleaning In Place) of the UHT 18. In addition, when a liquid amount in the surge tank 19 reaches an upper limit, the beverage as a product liquid is not sent to the surge tank 19, but can be returned to the balance tank 5 through the return line 6 while the UHT 18 is not stopped but kept in operation. Further, the return line 6 is used for SIP (Sterilizing in Place). Moreover, when no liquid can be sent to the surge tank 19 for holding a required pressure in order to keep a temperature of the holding tube 14 at a high temperature of 100° C. or higher, a fluid can be circulated by means of the return line 6.

In the upstream pipe part 7a of the beverage supply pipe 7, a plurality of thermometers 10, 10a and 10b are disposed at locations that are important in the operation of the UHT. The locations where the thermometers 10, 10a and 10b are disposed may include, for example, in the UHT 18, an outlet of the first-stage heating unit 12, an outlet of the second-stage heating unit 13, an outlet of the holding tube 14, an outlet of the first-stage cooling unit 15, an outlet of the second-stage cooling unit 16, an outlet of the third-stage heating unit 17, and a position in front of the manifold valve 8. The thermometers 10, 10a and 10b are respectively disposed at these locations. Information of temperatures respectively measured by these thermometers 10, 10a and 10b is sent to a control unit 40.

In the beverage supply pipe 7, thermometers 10 are also disposed on the downstream pipe part 7b, which extends from the surge tank 19 to reach the filler 2 via the head tank 11, at respective locations including a location where a temperature does not easily rise when heated steam is supplied thereto. The locations where the thermometers 10 are disposed may include, for example, in the downstream pipe part 7b extending from the surge tank 19 to the filling nozzles 2a, a position near an outlet of the surge tank 19, a low position where steam condenses so that drain accumulates and the temperature lowers, such as a midway bent portion, positions near an inlet and an outlet of the head tank 11. Information of temperatures respectively measured by these thermometers 10 is sent to the control unit 40.

Figure 1:
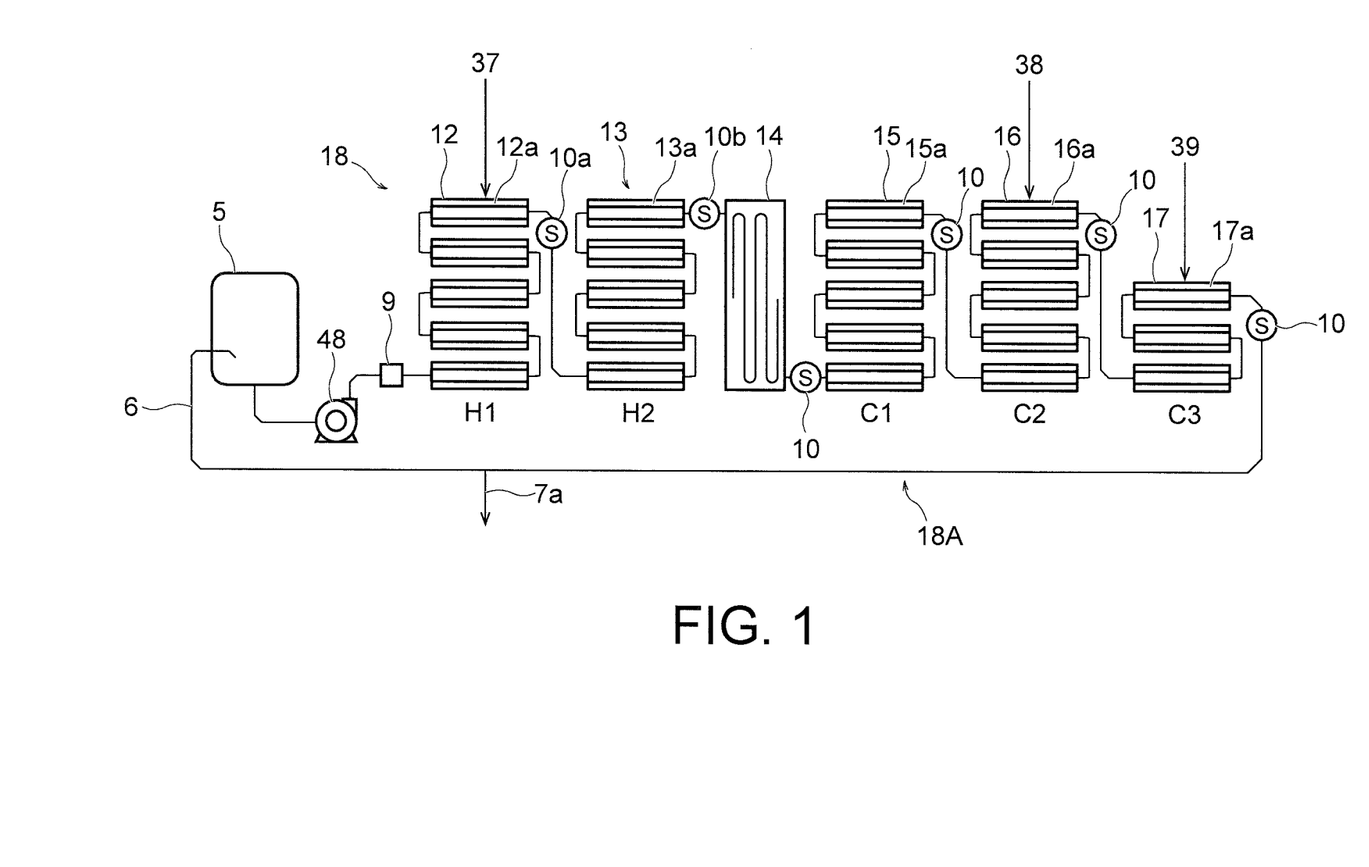
FIG. 1 is view showing a heat sterilization apparatus of an aseptic filling system.

Next, the UHT 18 is further described with reference to FIGS. 1 and 2. As shown in FIGS. 1 and 2, the UHT 18 has the first-stage heating unit 12, the second-stage heating unit 13, the holding tube 14, the first-stage cooling unit 15, the second-stage cooling unit 16 and the third-stage cooling unit 17. The first-stage heating unit 12 includes heating pipes 12 arranged in five stages, the second-stage heating unit 13 includes heating pipes 13a arranged in five stages, the first-stage cooling unit 15 includes cooling pipes 15a arranged in five stages, the second-stage cooling unit 16 includes cooling pipes 16a arranged in five stages, and the third-stage cooling unit 17 includes cooling pipes 17a arranged in three stages.

Figure 3:
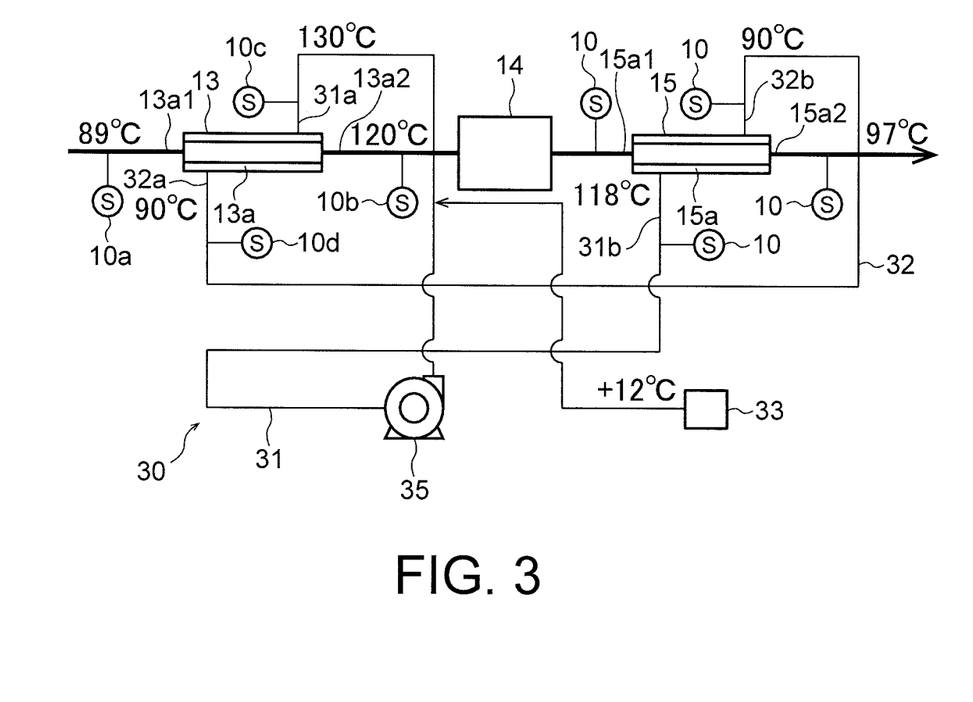
FIG. 3 is a view showing a hot-water line and a cooling-water line connected to a second-stage heating unit and a first-stage cooling unit.

As shown in FIG. 3, the second-stage heating unit 13, which is positioned most downstream among the heating units 12 and 13, and the first-stage cooling unit 15, which is positioned most upstream among the cooling units 15, 16 and 17 are connected to each other by a hot-water line 31 through which hot water from the first-stage cooling unit 15 to the second-stage heating unit 13. They are also connected by a cooling-water line 32 through which cooling water from the second-stage heating unit 13 is supplied to the first-stage cooling unit 15.

In FIGS. 2 and 3, the first-stage heating unit 12, the second-stage heating unit 13, the first-stage cooling unit 15, the second-stage cooling unit 16 and the third-stage cooling unit 17 are illustrated as a single-stage structure for the sake of convenience.

The hot-water line 31 and the cooling-water line 32 which connect the second-stage heating unit 13 and the first-stage heating unit 15 form a hermetically closed circulation line 30. Namely, the hot-water line 31 connects to the second-stage heating unit 13 and then joins the cooling-water line 32, and the cooling-water line 32 connects to the first-stage cooling unit 15 and then joins the hot-water line 31, whereby the hot-water line 31 and the cooling-water line 32 form a hermetically closed line that is closed from outside.

The hot-water line 31 is provided with a heated-steam supply unit 33 that supplies heated steam into the hot-water line 31. Hot-water flowing through the hot-water line 31 is heated to a high temperature by the heated steam supplied by the heated-steam supply unit 33. The hot-water line 31 is further provided with a pressure pump 35.

As shown in FIG. 1, a pressure pump 48 that pressurizes a content and a flowmeter 9 are installed between the balance tank 5 and the UHT 18. A hot-water line 37 that heats the first-stage heating unit 12 of the UHT 18 is connected to the first-stage heating unit 12. In addition, a cooling-water line 38 that cools the second-stage cooling unit 16 is connected to the second-stage cooling unit 16. Further, a cooling-water line 39 that cools the third-stage cooling unit 17 is connected to the third-stage cooling unit 17.

As described above, the thermometers 10, 10a and 10b are installed at a plurality of locations in the aseptic filling system 1A. As shown in FIG. 3, the most downstream second-stage heating unit 13 among the first-stage heating unit 12 and the second-stage heating unit 13 has a heating pipe 13a. The thermometer 10a (also referred to as first thermometer 10a) is installed at an inlet (fluid inlet) 13a1 of the heating pipe 13a, and the thermometer 10b (also referred to as second thermometer 10b) is installed at an outlet (fluid outlet) 13a2 of the heating pipe 13a.

Further, in the hot-water line 31, a third thermometer 10c is installed at an inlet (medium inlet) 31a of the second-stage heating unit 13. In the cooling-water line 32, a fourth thermometer 10d is installed at an outlet (medium outlet) 32a of the second-stage heating unit 13.

Next, an operation of the embodiment as structured above is described.

Firstly, a beverage is prepared in the preparation apparatus 1, and is sent from the balance tank 5 to the heat sterilization apparatus (UHT) 18. The beverage is heat-sterilized in the heat sterilization apparatus 18.

The beverage having been heat-sterilized in the heat sterilization apparatus 18 is then stored in the surge tank 19, and is thereafter sent to the head tank 11. Then, the beverage in the head tank 11 is supplied to the filler 2, and is filled into the bottles b through the filling nozzles 2a in the filler 2 in an aseptic state. Then, the bottles b filled with the beverage are discharged outside from the filler 2.

Next, an operation in the UHT 18 is described in detail herebelow.

As shown in FIG. 2, the beverage supplied from the balance tank 5 is sent to the first-stage heating unit 12 of the UHT 18 and the second-stage heating unit 13 thereof. In the first-stage heating unit 12 and the second-stage heating unit 13, the beverage is heated from a normal temperature (20° C.) to 130° C., for example. While the beverage is being heated from 20° C. up to 130° C., the beverage is sterilized by heating.

Then, the beverage, which has been heated in the first-stage heating unit 12 and the second-stage heating unit 13, is kept or heated at or to a target temperature of, e.g., 130° C. by a not-shown heating mechanism in the holding tube 14.

Then, the beverage from the holding tube 14 is cooled in the first-stage cooling unit 15, so that its temperature lowers from e.g., 130° C. down to, e.g., 100° C.

The beverage having been cooled by the first-stage cooling unit 15 is further cooled by the second-stage cooling unit 16 and the third-stage cooling unit 17, so that its temperature lowers from, e.g., 100° C. down to, e.g., 30° C.

Then, the beverage having been cooled by the third-stage cooling unit 17 is sent to the surge tank 19 via the manifold valve 8.

During this, as shown in FIG. 3, high-temperature water (hot water) flowing through the hot-water line 31 is supplied into the second-stage heating unit 13, so that the beverage is heated in the second-stage heating unit 13. The hot water that heats the beverage in the second-stage heating unit 13 thereafter becomes cooling water and flows through the cooling-water line 32. Then, the cooling water in the cooling-water line 32 is supplied to the first-stage cooling unit 15 so as to cool the beverage having a high temperature in the first-stage cooling unit 15. In the first-stage cooling unit 15, the temperature of the cooling water rises so that the cooling water becomes high-temperature water (hot water). The hot water enters the hot-water line 31.

Then, heated steam is supplied from the heated-steam supply unit 33 into the hot water flowing through the hot-water line 31, so that the temperature of the hot water rises.

Since the circulation line 30 including the hot-water line 31 and the cooling-water line 32 shown in FIG. 3 is a hermetically closed line that is hermetically closed from outside, the hot water and the cooling water flowing through the circulation line 30 is kept aseptic.

After the aforementioned aseptic filling operation to the bottles b has been finished, the CIP cleaning process for the UHT 18 is performed.

As shown in FIG. 1, after the content in the UHT 18 has been discharged outside, a cleaning liquid and a rinse liquid are sequentially supplied into the balance tank 5. Thus, the inside of the UHT 18 is cleaned by means of a fluid circulation line 18A which includes the upstream pipe part 7a connecting the balance tank 5 and the UHT 18, and the return line 6 connecting the balance tank 5 and the UHT 18.

The CIP cleaning is typically performed by causing an alkaline cleaning liquid, which is formed by adding, to water, an alkaline agent as a mixture of caustic soda (sodium hydroxide), potassium hydroxide, sodium carbonate, sodium silicate, sodium phosphate, sodium hypochlorite, surfactant, chelating agent, etc., to flow through the UHT 18, and then by causing an acidic cleaning liquid, which is formed by adding, to water supplied from a not-shown cleaning-liquid supply source, an acidic agent based on nitric acid and/or phosphoric acid, to flow through the UHT 18. In the CIP cleaning, the order of flow of the alkaline cleaning liquid and the acidic cleaning liquid is not limited to the above. For example, the alkaline cleaning liquid may be caused to flow after the acidic cleaning liquid has been caused to flow. Alternatively, the cleaning may be performed by causing to flow only any one of the acidic cleaning liquid and the alkaline cleaning liquid, or only hot water In this case, the alkaline cleaning liquid, the acidic cleaning liquid and the hot water constitute the cleaning liquid.

To be specific, an alkaline cleaning liquid such as caustic soda is supplied into the balance tank 5. Then, the pressure pump 48 is actuated to cause the alkaline cleaning liquid to flow through the fluid circulation line 18A including the balance tank 5, the UHT 18, the upstream pipe part 7a and the return line 6. Thereafter, the alkaline cleaning liquid is discharged from the fluid circulation line 18A, and then a rinse liquid (water) is supplied into the balance tank 5 so as to cause the rinse liquid to flow through the fluid circulation line 18A including the balance tank 5, the UHT 18, the upstream pipe part 7a and the return line 6. Subsequently, the rinse liquid is discharged from the liquid circulation line 18A.

After that, similarly to the above, an acidic cleaning liquid such as nitric acid and/or phosphoric acid is caused to flow through the fluid circulation line 18A. Thereafter, the acidic cleaning liquid is discharged from the fluid circulation line 18A, rinse liquid is then caused to flow through the fluid circulation line 18A, and then the rinse liquid is discharged from the liquid circulation line 18A.

In this manner, the UHT 18 can be subjected to the CIP cleaning.

The CIP cleaning can be performed by sequentially supplying the balance tank 5 of the UHT 18 with an alkaline cleaning liquid, an acidic cleaning liquid and a rinse liquid, and by actuating the pressure pump 48 so as to supply these fluids into the fluid circulation line 18A including the balance tank 5, the UHT 18, the upstream pipe part 7a and the return line 6. In this case, the pressure pump 48 functions as a fluid supply unit.

During this, the CIP cleaning is controlled by the control unit 40.

Namely, the control unit 40 actuates the pressure pump 48 to cause the aforementioned alkaline cleaning liquid, the acidic cleaning liquid and the rinse liquid to flow through the fluid circulation line 18A, so as to clean the inside of the UHT 18, in particular, the inside of the heating pipe 13a of the second-stage heating unit 13, which is easily soiled. The heating pipe 13a of the second-stage heating unit 13 is a part that heat-sterilizes a content at a high temperature, and thus an inside of the heating pipe 13a is easily soiled, e.g., burned.

In this embodiment, the CIP cleaning is efficiently performed to clean the inside of the UHT 18 by monitoring an overall heat transfer coefficient of the heating pipe 13a of the second-stage heating unit 13, which is easily soiled, as described below.

Next, the CIP cleaning method by the control unit 40 is described below.

The control unit 40 includes a storage unit 41 that stores various data, and a monitor unit 42 that calculates an overall heat transfer coefficient of the heating pipe 13a of the second-stage heating unit 13. The control unit 40 determines whether an overall heat transfer coefficient calculated by the monitor unit 42 exceeds a desired value or not. When the overall heat transfer coefficient exceeds the desired value, the control unit 40 determines that the cleaning of the inside of the UHT 18 has completed, and finishes the cleaning of the inside of the UHT. Then, the control unit 40 allows the process to proceed from the cleaning-liquid supply step to the rinse-liquid supply step or the beverage manufacturing step, or stops the pressure pump 48 (see FIG. 8). The overall heat transfer coefficient calculated by the monitor unit 42 is stored in the storage unit 41. Further, the control unit 40 includes a cleaning-condition determination unit 44 that determines an optimum cleaning condition in the UHT 18 during the CIP cleaning, by using the overall heat transfer coefficient stored in the storage unit 41. Optimum cleaning conditions of the UHT 18 (CIP conditions) may include a cleaning period of each of an alkaline cleaning liquid, a rinse liquid, an acidic cleaning liquid and a rinse liquid, a cleaning-liquid concentration, a cleaning-liquid type, a cleaning-liquid flowrate, a supply pattern, the number of repetition of supply cycle, etc., for soiling such as burning caused by beverages as various product liquids and manufacturing time.

Next, an operation of the control unit 40 as structured above is described.

Figure 7:
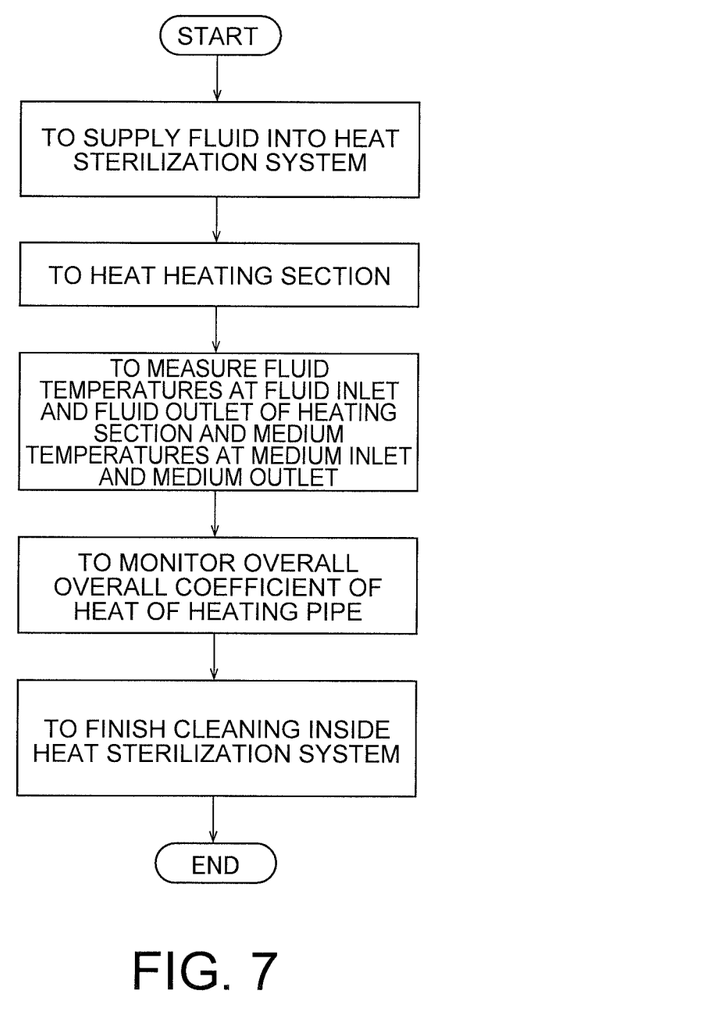
FIG. 7 is a flowchart showing a cleaning method of the heat sterilization system.

As shown in FIG. 7, as described above, the control unit 40 firstly actuates the pressure pump 48 to sequentially supply an alkaline cleaning liquid, an acidic cleaning liquid and a rinse liquid into the fluid circulation line 18A, which includes the balance tank 5, the UHT 18, the upstream pipe part 7a and the return line 6 so as to circulate them therethrough. At this time, the control unit 40 activates the hot-water line (heating unit) 31 to heat the heating pipe 13a of the second-stage heating unit 13. Simultaneously, the control unit 40 activates the cooling-water line 32.

To be specific, as shown in FIG. 3, the second-stage heating unit 13 is heated by the hot-water line 31. Further, hot water in the hot-water line 31 is heated by heated steam supplied from the heated-steam supply unit 33.

Thus, a temperature of the inlet (fluid inlet) 13a1 of the heating pipe 13 a of the second-stage heating unit 13 is measured by the thermometer 10a to obtain 89° C., and a temperature of the outlet (fluid outlet) 13a2 of the heating pipe 13a is measured by the thermometer 10b (120° C.). Simultaneously, a temperature of an inlet 15a1 of a cooling pipe 15a of the first cooling unit 15 is measured by the thermometer 10 (118° C.), and a temperature of an outlet 15a2 of the cooling pipe 15a is measured by the thermometer 10 (97° C.).

On the other hand, a temperature of the inlet (medium inlet) 31a of the second-stage heating unit 13 of the hot-water line 31 is measured by the thermometer 10c (130° C.), and a temperature of the outlet (medium outlet) 32a of the second-stage heating unit 12 of the cooling-water line 32 is measured by the thermometer 10*d* (90° C.).

In addition, a temperature of an inlet 32*b* of the first-stage cooling unit 15 of the cooling-water line 32 is 90° C., and a temperature of an outlet 31*b* of the first-cooling unit 15 of the hot-water line 31 is 118° C.

The control unit 40 calculates an overall heat transfer coefficient (U value) of the heating pipe 13*a* of the second-stage heating unit 13, from the temperatures of the respective thermometers 10*a*, 10*b*, 10*c* and 10*d*, which have been measured by the thermometers 10*a*, 10*b*, 10*c* and 10*d*.

To be specific, a temperature T1 of a fluid formed of an alkaline cleaning liquid, an acidic cleaning liquid, or a rinse liquid at the inlet (fluid inlet) 13*a*1 of the heating pipe 13*a* of the second-stage heating unit 13, and a temperature T2 of the fluid at the outlet (fluid outlet) 13*a*2 are measured by the thermometers 10*a* and 10*b*.

In addition, a temperature T3 of hot water (medium) at the inlet (medium inlet) 31*a* of the second-stage heating unit 13, and a temperature T4 of the hot water at the outlet (medium outlet) 32*a* are measured by the thermometers 10*c* and 10*d*.

Simultaneously, a flowrate R of the fluid circulating the fluid circulation line 18A, which includes the balance tank 5, the UHT 18, the upstream pipe 7*a* and the return line 6, is measured by a flowmeter 9.

Figure 8:
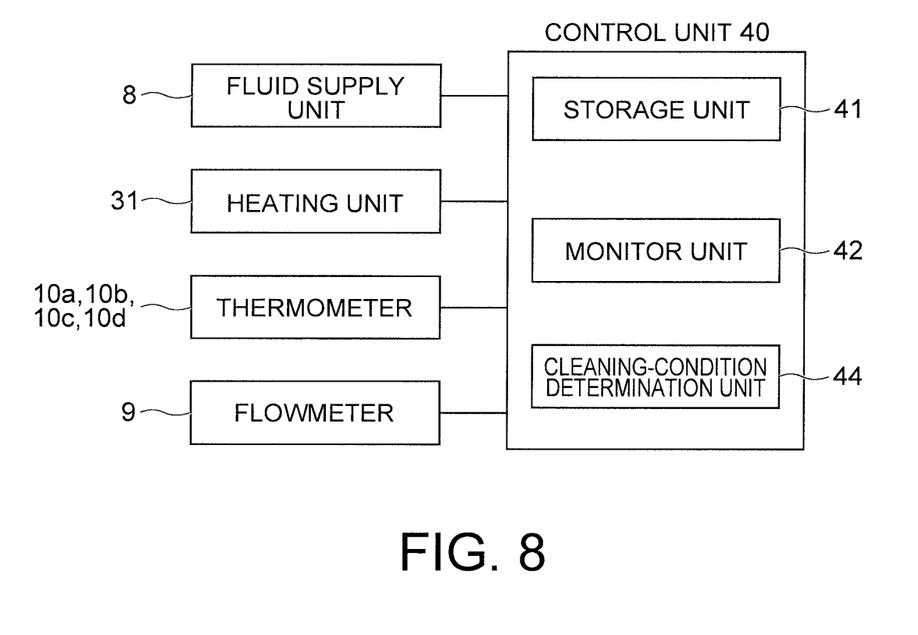
FIG. 8 is a block diagram showing a control unit of the heat sterilization system.

The monitor unit 42 of the control unit 40 firstly calculates a logarithmic mean temperature difference ΔT in the second-stage heating unit 13, based on the aforementioned temperatures T1, T2, T3 and T4.

To be specific, a logarithmic mean temperature difference ΔT is calculated as follows.

$$\Delta T = \left| \frac{((T4-T1)-(T3-T2))}{\ln((T4-T1)/(T3-T2))} \right| \quad \text{Expression (1)}$$

Then, an amount of heat Q in the second-stage heating unit 13 is calculated based on the temperature T1, the temperature T2 and the flowrate R (L/h). When a specific heat is 1 (kcal/kg·° C.) and a specific weight is 1 (kg/L), Q is calculated by the following expression:

$$Q = 1 \times 1 \times R \times (T2-T1) \quad \text{Expression (2)}.$$

A heat transfer area A ($m^2$) of the heating pipe 13*a* of the second-stage heating unit 13 is predetermined.

From the above, the monitor unit 42 calculates an overall heat transfer coefficient (U value) of the second-stage heating unit 13 by the following expression:

$$U = Q/(A \times \Delta T) \quad \text{Expression (3)}.$$

The U value of the second-stage heating unit 13 lowers as a content is heated by using the UHT 18. By subjecting the UHT 18 to the CIP cleaning, the U value gradually rises. When the U value reaches a desired value, the CIP cleaning can be finished.

In this embodiment, the monitor unit 42 of the control unit 40 calculates a U value of the second-stage heating unit 13, and also monitors the U value. When the U value monitored by the monitor unit 42 reaches a desired value, the process proceeds to a next step, or a stop unit 43 of the control unit 40 stops the pressure pump 48 and the control unit 40 simultaneously deactivates the hot-water line 31 and the cooling-water line 32.

The U value monitored by the monitor unit 42 is stored in the storage unit 41. A fluid-supply-pattern determination unit 44 of the control unit 40 determines an optimum fluid supply pattern in the CIP cleaning, based on the U value stored in the storage unit 41.

In this embodiment, the CIP cleaning repeats a supply cycle of an alkaline cleaning liquid, a rinse liquid, an acidic cleaning liquid and a rinse liquid, wherein the fluid circulation line 18A is supplied with an alkaline cleaning liquid of a predetermined concentration, a rinse liquid, an acidic cleaning liquid of a predetermined concentration, and a rinse liquid are respectively supplied for a predetermined period of time.

According to the present embodiment, by monitoring a U value in the second-stage heating unit 13, an optimum cleaning condition (CIP condition) including a cleaning period of each of an alkaline cleaning liquid, a rinse liquid, an acidic cleaning liquid and a rinse liquid, a cleaning-liquid concentration, a cleaning-liquid type, a cleaning-liquid flowrate, a supply pattern, the number of repetition of supply cycle, etc., can be determined for soiling such as burning caused by beverages as various product liquids and manufacturing time.

As described above, according to this embodiment, during the CIP cleaning, a U value of the second-stage heating unit 13 is calculated, and the U value is monitored. When the U value reaches a desired value, the CIP cleaning is stopped and a next step can be performed. Thus, it is not necessary to continue the CIP cleaning more than necessary, whereby the CIP cleaning can be performed efficiently.

Further, since a U value of the second-stage heating unit 13 is calculated while the second-stage heating unit 13 is being heated, an appropriate temperature difference can be provided between a temperature T1 at the fluid inlet 13*a*1 and a temperature T2 at the fluid outlet 13*a*2. Thus, a U value of the second-stage heating unit 13 can be reliably calculated by using the above Expression (1). In general, when the CIP cleaning is carried out, the second-stage heating unit 13 is not particularly heated and the first-stage to the third-stage cooling units 15 to 17 are also not particularly cooled. In this case, a cleaning liquid or a rinse liquid flows at a constant temperature through the first-stage and the second-stage heating units 12 and 13, and the first-stage to the third-stage cooling units 15 to 17. In particular, since no temperature difference is generated between the inlet 13*a*1 of the heating pipe 13 of the second-stage heating unit 13 and the outlet 13*a*2 thereof, it is impossible to calculate a U value of the second-stage heating unit 13 by the aforementioned method. On the other hand, as described above, this embodiment can easily and reliably calculate a U value of the second-stage heating unit 13.

EXAMPLES

Figure 4:
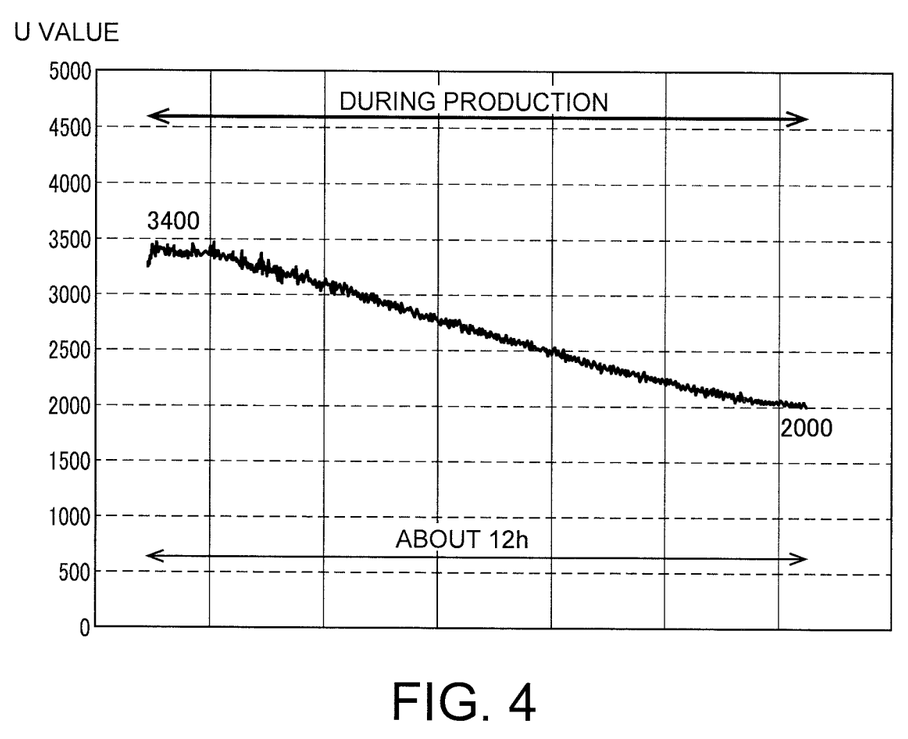
FIG. 4 is a view showing a U value during production in an example where coffee with milk is used as a content.
Figure 5:
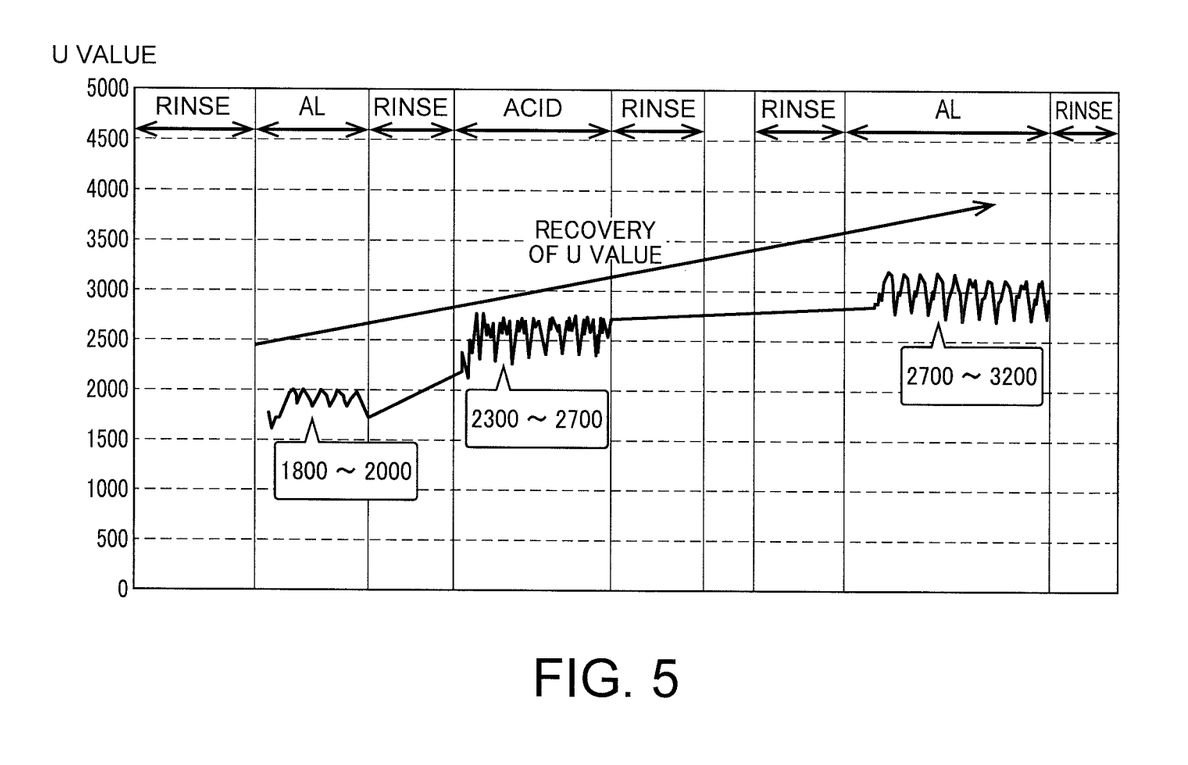
FIG. 5 is a view showing a U value during CIP cleaning in the example where coffee with milk is used as a content.
Figure 6:
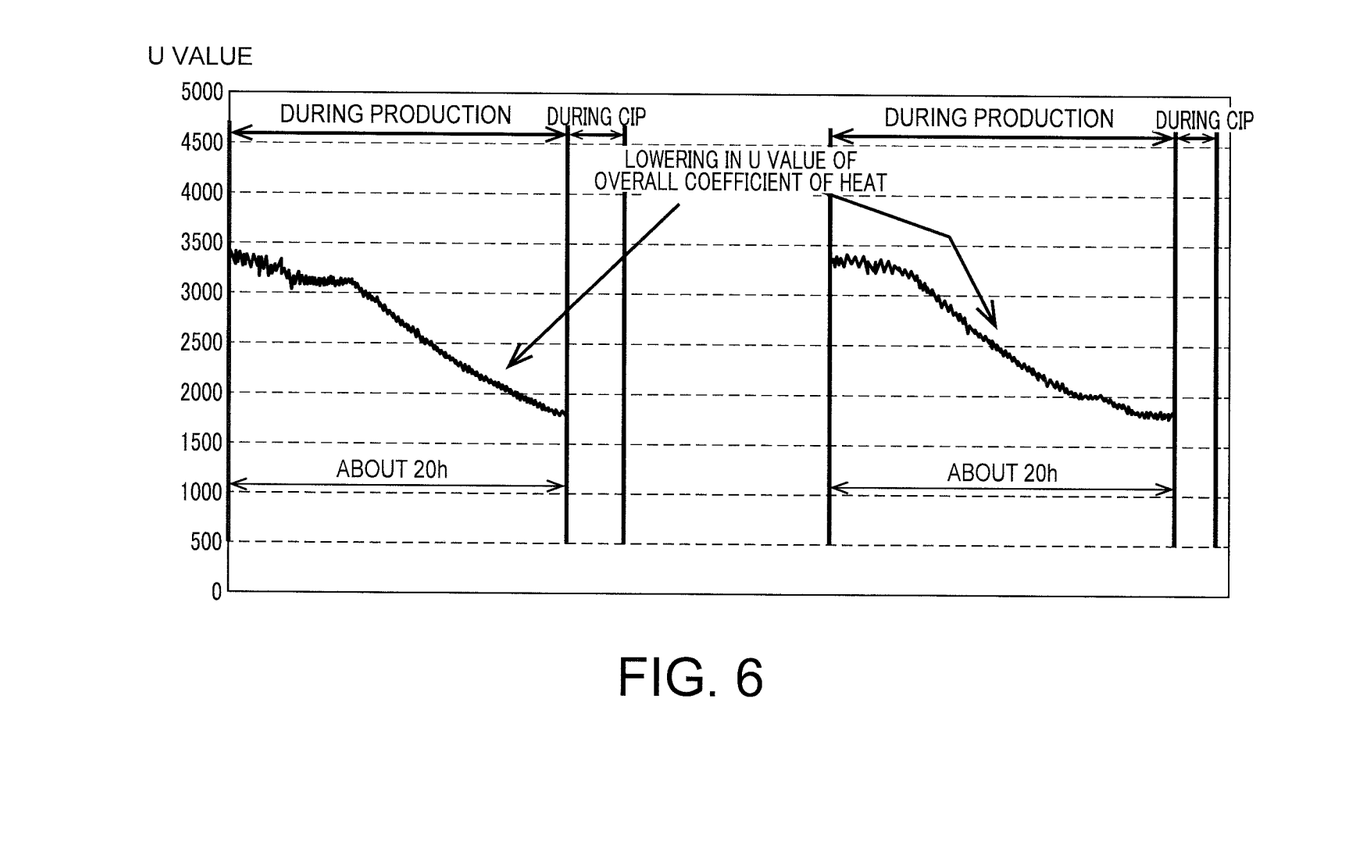
FIG. 6 a view showing a U value during production in an example where black coffee is used as a content.

Specific examples of the present disclosure are described herebelow with reference to FIGS. 4 to 6.

FIG. 4 shows a U value in the second-stage heating unit 13 when a bottle b filled with a content is produced by using the aseptic filling system.

In FIG. 4 where coffee with milk is used as a content, the U value in the second-stage heating unit 13 gradually lowers.

In this embodiment, after the use of the aseptic filling system with coffee with milk, the UHT 18 is subjected to the CIP cleaning (see FIG. 5). In this case, during the CIP cleaning, supply of an alkaline cleaning liquid, supply of a rinse liquid, supply of an acidic cleaning liquid and supply of rinse liquid is repeated. Thus, even when coffee with milk, which easily burns and soils the inside of a pipe, is used as a content, it can be understood that the U value of the second stage heating unit 13 gradually rises.

In this embodiment, when the U value reaches a desired value, the CIP cleaning of the UHT 18 is stopped.

As shown in FIGS. 4 and 5, according to the example, the CIP cleaning can be performed for an appropriate time to reliably clean the inside of the UHT 18, without performing the CIP cleaning unnecessarily for a long time.

Next, FIG. 6 shows a U value when a bottle b filled with a content is produced by using the aseptic filling system.

In FIG. 6 where black coffee is used as a content, the U value in the second-stage heating unit 13 gradually lowers.

In this embodiment, after the use of the aseptic filling system with black coffee, the UHT 18 is subjected to the CIP cleaning. In this case, during the CIP cleaning, supply of an alkaline cleaning liquid, supply of a rinse liquid, supply of an acidic cleaning liquid and supply of rinse liquid is repeated. Thus, even when black coffee, which easily burns and soils the inside of a pipe, is used as a content, the U value of the second-stage heating unit 13 can be recovered by the CIP cleaning to a value just before lowering.

In this embodiment, when the U value reaches a desired value, the CIP cleaning of the UHT 18 is stopped. After a predetermined time has elapsed after the CIP cleaning, black coffee as a content is aseptically filled into a bottle b by using the aseptic filling system.

Also in the example shown in FIG. 6, the CIP cleaning can be performed for an appropriate time to reliably clean the inside of the UHT 18, without performing the CIP cleaning unnecessarily for a long time.

In the aforementioned embodiment, the flow of a heating medium and a cooling medium between the second-stage heating unit 13 and the first-stage cooling unit 15 is described (see FIG. 3). However, a heating medium and a cooling medium may be similarly caused to flow between the first second hating units 12 and 13 and the first to third cooling units 15, 16 and 17. In addition, the heat sterilization apparatus 18 may have a shell-and-tube heat exchanger, or may have a plate heat exchanger. The filler 2 is not limited to an aseptic filling machine, but may have any structure as long as it can heat-sterilize beverages including hot packs and chilled beverages.

1A Aseptic filling system
1 Preparation apparatus
2 Filler
2a Filling nozzle
3 Aseptic chamber
3a Spray
5 Balance tank
6 Return line
7 Beverage supply pipe
7a Upstream pipe part
7b Downstream pipe part
7c Connection pipe part
10 Thermometer
10a First thermometer
10b Second thermometer
10c Third thermometer
10d Fourth thermometer
11 Head tank
12 First-stage heating unit
13 Second-stage heating unit
14 Holding tube
15 First-stage cooling unit
16 Second-stage cooling unit
17 Third-stage cooling unit
18 Heat sterilization apparatus (UHT)
18A Fluid circulation line
30 Circulation line
31 Hot-water line
32 Cooling-water line
33 Heated steam supply unit
35 Pressure pump
37 Hot-water line
38 Cooling-water line
39 Cooling-water line
40 Control unit
41 Storage unit
42 Monitor unit
43 Stop unit
44 Fluid-supply-pattern determination unit
48 Pressure pump

The invention claimed is:

1. A cleaning method of a heat sterilization system comprising a plurality of heating sections, connected to each other in series for heating a content, each heating section having a heating pipe with a fluid inlet and a fluid outlet, the cleaning method comprising:
 a step of causing a fluid including at least a cleaning liquid to flow through the heating pipe of each heating section so as to clean an inside of the heating pipe of each heating section;
 a step of heating the heating pipe of each heating section from outside by means of a medium;
 a step of measuring fluid temperatures of the fluid including at least the cleaning liquid at the fluid inlet and the fluid outlet of the heating pipe of the heating section which is positioned most downstream among the heating sections;
 a step of measuring medium temperatures of the medium at a medium inlet and a medium outlet of the heating section which is positioned most downstream among the heating sections; and
 a step of calculating an overall heat transfer coefficient of the heating pipe of the heating section which is positioned most downstream among the heating sections and monitoring the increasing overall heat transfer coefficient in a case where the fluid including at least the cleaning liquid is caused to flow through the heating pipe of the heating section which is positioned most downstream among the heating sections and the medium is caused to flow outside the heating pipe of the heating section which is positioned most downstream among the heating sections, based on the fluid temperatures at the fluid including at least the cleaning liquid at the fluid inlet and the fluid outlet of the heating pipe of the heating section which is positioned most downstream among the heating sections and the medium temperatures of the medium at the medium inlet and the medium outlet of the heating section which is positioned most downstream among the heating sections.

2. The cleaning method of a heat sterilization system according to claim 1, wherein
 when the overall heat transfer coefficient exceeds a desired value, the cleaning of the inside of the heating pipe of the heating section which is positioned most downstream among the heating sections of the heat sterilization system is finished.

3. The cleaning method of a heat sterilization system according to claim 1, wherein
 a cleaning condition of the heating pipe of the heating section which is positioned most downstream among the heating sections of the heat sterilization system is determined based on the overall heat transfer coefficient.

4. A cleaning apparatus of a heat sterilization system comprising a plurality of heating sections, connected to each other in series for heating a content, each heating section having a heating pipe with a fluid inlet and a fluid outlet, the cleaning apparatus comprising:
- a fluid supply unit that causes a fluid including at least a cleaning liquid to flow through the heating pipe of each heating section so as to clean an inside of the heating pipe of each heating section;
- a heating unit that heats the heating pipe of each heating section from outside by means of a medium;
- a thermometer that measures fluid temperatures of the fluid including at least the cleaning liquid at the fluid inlet and the fluid outlet of the heating pipe of the heating section which is positioned most downstream among the heating sections, and medium temperatures of the medium at a medium inlet and a medium outlet of the heating section which is positioned most downstream among the heating sections; and
- a control unit;
- wherein the control unit includes a monitor unit that calculates an overall heat transfer coefficient of the heating pipe which is positioned most downstream among the heating sections and monitors the increasing overall heat transfer coefficient in a case where the fluid including at least the cleaning liquid is caused to flow through the heating pipe of the heating section which is positioned most downstream among the heating sections and the medium is caused to flow outside the heating pipe of the heating section which is positioned most downstream among the heating sections, based on the fluid temperatures of the fluid including at least the cleaning liquid at the fluid inlet and the fluid outlet of the heating pipe of the heating section which is positioned most downstream among the heating sections and the medium temperatures of the medium at the medium inlet and the medium outlet of the heating section which is positioned most downstream among the heating sections.

5. The cleaning apparatus of a heat sterilization system according to claim 4, wherein
the control unit finishes the cleaning of the inside of the heating pipe of the heating section which is positioned most downstream among the heating sections of the heat sterilization system, when the overall heat transfer coefficient exceeds a desired value.

6. The cleaning apparatus of a heat sterilization system according to claim 4, wherein
the control unit includes a cleaning-condition determination unit that determines a cleaning condition of the heating pipe of the heating section which is positioned most downstream among the heating sections of the heat sterilization system based on the overall heat transfer coefficient.

\* \* \* \* \*